US012620578B2

(12) United States Patent
Lee et al.

(10) Patent No.: US 12,620,578 B2
(45) Date of Patent: May 5, 2026

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Chang Woo Lee, Cheongju-si (KR); Moon Ho Choi, Cheongju-si (KR); Hyun Jong Yu, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 47 days.

(21) Appl. No.: 17/349,737

(22) Filed: Jun. 16, 2021

(65) Prior Publication Data

US 2022/0069294 A1      Mar. 3, 2022

(30) Foreign Application Priority Data

Aug. 28, 2020      (KR) ........................ 10-2020-0109044

(51) Int. Cl.
| | |
|---|---|
| *H01M 4/36* | (2006.01) |
| *H01M 4/02* | (2006.01) |
| *H01M 4/505* | (2010.01) |
| *H01M 4/525* | (2010.01) |
| *H01M 4/58* | (2010.01) |
| *H01M 10/0525* | (2010.01) |

(52) U.S. Cl.
CPC ........... *H01M 4/366* (2013.01); *H01M 4/505* (2013.01); *H01M 4/525* (2013.01); *H01M 4/5825* (2013.01); *H01M 2004/028* (2013.01); *H01M 10/0525* (2013.01)

(58) Field of Classification Search
CPC ...... H01M 4/366; H01M 4/505; H01M 4/525; H01M 4/5825; H01M 10/0525; H01M 2004/028
See application file for complete search history.

(56) References Cited

U.S. PATENT DOCUMENTS

| | | | |
|---|---|---|---|
| 2013/0309580 A1 | 11/2013 | Tomura | |
| 2016/0197341 A1* | 7/2016 | Lu ........................... | H01M 4/62 |
| | | | 429/223 |
| 2019/0081319 A1* | 3/2019 | Nakayama ........ | H01M 10/0525 |
| 2019/0300382 A1* | 10/2019 | Kim ...................... | H01M 4/505 |
| 2020/0136132 A1* | 4/2020 | Hong .................. | H01M 4/1391 |
| 2020/0274161 A1* | 8/2020 | Michot ............... | H01M 4/1397 |

FOREIGN PATENT DOCUMENTS

| | | |
|---|---|---|
| CN | 107093741 A | 8/2017 |
| CN | 108807926 A | 11/2018 |
| CN | 109216678 A | 1/2019 |
| CN | 109891643 A | 6/2019 |
| JP | 2020-068208 A | 4/2020 |
| KR | 10-2020-0022320 A | 3/2020 |
| KR | 10-2020-0046485 A | 5/2020 |

OTHER PUBLICATIONS

Wu et al., Morphology-controllable synthesis of LiCoPO4 and its influence on electrochemical performance for high-voltage lithium ion batteries, Jan. 29, 2020, Journal of Power Sources 450, 227726 (Year: 2020).*
Keil et al., New Insights into the Catalytic Activity of Cobalt Orthophosphate Co3(PO4)2 from Charge Density Analysis, Nov. 8, 2019, Chem. Eur. J,, 25, 15786-15794 (Year: 2019).*
Yoojung Kim et al., "Lithium-Reactive Co3(PO4)2 Nanoparticle Coating on High-Capacity LiNi0.8Co0.16Al0.04O2 Cathode Material for Lithium Rechargeable Batteries", Journal of the Electrochemical Society, 154(6), pp. A495-A499, Apr. 4, 2007.

* cited by examiner

*Primary Examiner* — Armindo Carvalho, Jr.
(74) *Attorney, Agent, or Firm* — Studebaker Brackett PLLC

(57)      ABSTRACT

The present invention relates to a positive electrode active material having improved electrochemical characteristics and improved stability, and a lithium secondary battery using a positive electrode including the positive electrode active material, and more particularly, to a positive electrode active material which may prevent decreases in electrochemical characteristics and stability of the positive electrode active material, which are caused by Li impurities, in advance by controlling the content of the Li impurities remaining on the surface of the positive electrode active material without a washing process to reduce the amount of residual lithium present on the surface thereof, and a lithium secondary battery using a positive electrode containing the positive electrode active material.

8 Claims, No Drawings

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2020-0109044, filed on Aug. 28, 2020, the disclosure of which is incorporated herein by reference in its entirety.

BACKGROUND

1. Field of the Invention

The present invention relates to a positive electrode active material having improved electrochemical characteristics and improved stability and a lithium secondary battery using a positive electrode containing the positive electrode active material, and more particularly, to a positive electrode active material which can prevent decreases in electrochemical characteristics and stability of the positive electrode active material, which are caused by Li impurities, in advance by controlling the content of the Li impurities remaining on the surface of the positive electrode active material without a washing process to reduce the amount of residual lithium present on the surface thereof, and a lithium secondary battery using a positive electrode containing the positive electrode active material.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

Meanwhile, a content of the Li impurities present on the surface of the positive electrode active material tends to increase proportional to an Ni content of the positive electrode active material.

Therefore, in the case of a high-Ni-type positive electrode active material recently introduced to improve the capacity characteristics of the positive electrode active material, due to the excessive presence of Li impurities in the surface, a washing process for removal thereof may be essential.

However, residual lithium present on the surface of the positive electrode active material may be reduced through the washing process, but damage may be generated on the surface of the positive electrode active material. When the surface of the positive electrode active material is damaged by the washing process, the electrochemical characteristics and stability of the positive electrode active material may deteriorate.

SUMMARY OF THE INVENTION

The present invention relates to a positive electrode active material having improved electrochemical characteristics and improved stability to solve various problems of a conventional positive electrode active material for a lithium secondary battery. Particularly, the present invention is directed to providing a positive electrode active material which can prevent decreases in electrochemical characteristics and stability of the positive electrode active material, which are caused by Li impurities, by controlling a content of the Li impurities remaining on a surface of the positive electrode active material without a washing process to reduce an amount of the residual lithium present on the surface thereof.

In addition, the present invention is also directed to providing a positive electrode including the positive electrode active material defined herein.

Moreover, the present invention is also directed to providing a lithium secondary battery which uses the positive electrode defined herein.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by the means indicated by the claims and a combination thereof.

According to one aspect of the present invention, a positive electrode active material includes a first compound enabling lithium intercalation/deintercalation and a second compound present on at least a part of the surface of the first compound.

Here, the second compound may be an oxide which includes at least one first element selected from Group 1A elements, Group 3A elements and Group 5A elements and at least one second element selected from Group 8 elements.

Here, the first compound may be represented by Formula 1 below, $$Li_wNi_{1-(x+y+z)}Co_xM1_yM2_zO_{2+\alpha} \qquad \text{[Formula 1]}$$

(Here,

M1 is at least one selected from Mn and Al,

M2 is at least one selected from Mn, P, Sr, Ba, B, Ti, Zr, Al, Hf, Ta, Mg, V, Zn, Si, Y, Sn, Ge, Nb, W and Cu, M1 and M2 are different elements, $0.5 \leq w \leq 1.5$, $0 \leq x \leq 0.50$, $0 \leq y \leq 0.20$, $0 \leq z \leq 0.20$, and $0 \leq \alpha \leq 0.02$).

The second compound may be represented by Formula 2 below.

$$Li_aCo_bM3_c(P_\beta O_\gamma)_d \qquad \text{[Formula 2]}$$

(Here,

M3 is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, $0 \leq c \leq 8$, $0 \leq d \leq 13$, $0 < \beta \leq 4$, and $0 < \gamma \leq 10$).

Here, the second compound may include a first oxide represented by Formula 3 below and a second oxide represented by Formula 4 below.

$$Li_{a'}Co_{b'}M3'_{c'}(P_{\beta'}O_{\gamma'})_{d'} \qquad \text{[Formula 3]}$$

(Here,

M3' is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 < a' \leq 10$, $0 \leq b' \leq 8$, $0 \leq c' \leq 8$, $0 < d' \leq 13$, $0 \leq \beta' \leq 4$, and $0 \leq y' \leq 10$).

$$Co_{b''}M3''_{c''}(P_{\beta''}O_{\gamma''})_{d''} \qquad \text{[Formula 4]}$$

(Here,

M3" is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq b'' \leq 8$, $0 \leq c'' \leq 8$, $0 < d'' \leq 13$, $0 \leq \beta'' \leq 4$, and $0 < \gamma'' \leq 10$).

In another embodiment, a third compound represented by Formula 5 below may be further included on at least a part of the surface of the first compound.

$$Li_cW_fM4_gO_h \qquad \text{[Formula 5]}$$

(Here,

M4 is at least one selected from Ni, Mn, Co, Fe, Cu, Nb, Mo, Ti, Al, Cr, Zr, Zn, Na, K, Ca, Mg, Pt, Au, B, P, Eu, Sm, Ce, V, Ba, Ta, Sn, Hf, Ce, Gd and Nd, $0 \leq e \leq 10$, $0 < f \leq 8$, $0 \leq g \leq 8$, and $2 \leq h \leq 13$).

In addition, another aspect of the present invention provides a positive electrode including the positive electrode active material described above.

Moreover, still another aspect of the present invention provides a lithium secondary battery using the positive electrode described above.

DETAILED DESCRIPTION OF EXEMPLARY EMBODIMENTS

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material according to the present invention, a positive electrode including the same, and a lithium secondary battery using the same will be described in further detail.

Positive Electrode Active Material

According to one aspect of the present invention, a positive electrode active material including a first compound enabling lithium intercalation/deintercalation and a coating layer present on at least a part of the surface of the first compound is provided.

The first compound may be a single-crystalline or polycrystalline lithium composite oxide, and preferably, a polycrystalline lithium composite oxide. A polycrystalline lithium composite oxide refers to an aggregate including primary particles and secondary particles in which the plurality of the first particles aggregate.

The primary particle refers to a single grain (or crystallite), and the secondary particle refers to an aggregate formed by aggregating a plurality of the primary particles. There may be a void and/or grain boundary between the primary particles constituting the secondary particle.

For example, the primary particle may be spaced apart from an adjacent primary particle in the secondary particle, thereby forming an inner void. In addition, the primary particle may not form a grain boundary by coming into contact with an adjacent primary particle, but may come into contact with an inner void, thereby forming a surface present in the secondary particle.

Meanwhile, a surface, which is exposed to an external atmosphere, of the primary particles present on the outermost surface of the secondary particle becomes the surface of the secondary particle.

Here, as the average particle diameter of the primary particle may be 0.1 to 5 μm, and preferably, 0.1 to 3 μm, the optimal densities of positive electrodes formed by using the positive electrode active materials according to various embodiments of the present invention may be realized. In addition, the average particle diameter may be 3 to 20 μm according to the number of aggregated primary particles.

In addition, the primary particle and/or the secondary particle may have a rod, oval and/or amorphous shape.

Here, the first compound is a lithium composite oxide represented by Formula 1 below.

$$Li_wNi_{1-(x+y+z)}Co_xM1_yM2_zO_{2+\alpha} \qquad \text{[Formula 1]}$$

(Here,

M1 is at least one selected from Mn and Al,

M2 is at least one selected from Mn, P, Sr, Ba, B, Ti, Zr, Al, Hf, Ta, Mg, V, Zn, Si, Y, Sn, Ge, Nb, W and Cu, M1 and M2 are different elements, $0.5 \leq w \leq 1.5$, $0 \leq x \leq 0.50$, $0 \leq y \leq 0.20$, $0 \leq z \leq 0.20$, and $0 \leq \alpha \leq 0.02$).

Here, the first compound may be a lithium composite oxide having a layered crystal structure containing at least Ni and Co. In addition, the first compound is preferably a high-Ni-type lithium composite oxide of Formula 1, in which x+y+z is 0.20 or less.

As described above, in the case of a Ni-containing lithium composite oxide, as the cationic mixing of Li and Ni increases, a large amount of residual lithium, that is, Li impurities, may be formed on the surface of the lithium composite oxide. The Li impurities mainly include LiOH and $Li_2CO_3$, and become the cause of gelation in the preparation of a paste for forming a positive electrode, or a swelling phenomenon of a cell.

As an Ni content of the lithium composite oxide increases, the content of the Li impurities increases proportionally, and generally, in the case of a high-Ni-type positive electrode active material (lithium composite oxide) having an Ni content of 80 mol %, a washing process for removing Li impurities on a surface is essential. However, the washing process may partially cause surface damage to the lithium composite oxide, and may be the cause of reducing the electrochemical characteristics and stability of the lithium composite oxide.

Meanwhile, lithium composite oxides according to various embodiments of the present invention and a positive electrode active material including the lithium composite oxide can effectively reduce the content of Li impurities remaining on the surface of the lithium composite oxide without a washing process by forming a lithium metal oxide and/or lithium metal phosphate to be described below.

In addition, the first compound may be doped with a metal element represented by M1 as shown in Formula 1, and M1 preferably includes tungsten (W).

Here, the tungsten may be present in the crystal lattice of the first compound. That is, the tungsten may be present while being substituted with Ni inserted into at least one of the Li 3a site and the 3b site of the first compound.

Meanwhile, when the first compound is doped with the tungsten, an Ni ratio ($Ni_{occ}$) inserted into the Li 3a site as measured by the Rietveld analysis of X-ray diffraction patterns may be increased, and thus the electrochemical characteristics and stability of the positive electrode active material may be improved. Here, the Ni ratio ($Ni_{occ}$) inserted into the Li 3a site may be increased by the increase in amount of Ni inserted into the Li 3a site through tungsten doping, or may be increased by inserting W into the Li 3a site. Preferably, when the first compound is doped with the tungsten, as at least some of the tungsten doped into the first compound is inserted into the Li 3a site, it may contribute to the improvement in electrochemical characteristics and stability of the first compound.

In this case, the first compound may be represented by Formula 1-1 below.

$$Li_wNi_{1-(x+y+z)}Co_xM1_yM2_zW_zO_{2+\delta} \quad \text{[Formula 1-1]}$$

(Here,

M1 is at least one selected from Mn and Al,

M2 is at least one selected from Mn, P, Sr, Ba, B, Ti, Zr, Al, Hf, Ta, Mg, V, Zn, Si, Y, Sn, Ge, Nb and Cu, M1 and M2 are different elements, $0.5 \leq w \leq 1.5$, $0 \leq x \leq 0.50$, $0 \leq y \leq 0.20$, $0 \leq z \leq 0.20$, $0 \leq z' \leq 0.20$, and $0 \leq \delta \leq 0.02$).

Additionally, the M1 present in the lithium composite oxide may show a concentration gradient decreasing from the surface to the center of the secondary particle.

The concentration gradient means that there is a (−) slope between the concentration of M1 at an arbitrary point of the surface of the secondary particle and the concentration of M1 at an arbitrary point of the center of the secondary particle.

As such, as there is the concentration gradient of M1, preferably, tungsten (W) in the secondary particle, the migration pathway (the diffusion pathway of lithium ions) of lithium ions in the secondary particle and the primary particle constituting the secondary particle may be formed in a direction from the surface to the center of the secondary particle.

The positive electrode active materials according to various embodiments of the present invention has a coating layer containing a second compound on its surface to reduce the content of residual Li, that is, Li impurities, present on the surface of the first compound.

Here, the second compound may be present on at least a part of the interface between primary particles of the first compound and the surface of the secondary particle formed by aggregating the primary particles. In addition, the concentration of the second compound may have a concentration gradient decreasing from the surface to the center of the secondary particle.

The coating layer may include the second compound, which is an oxide including at least one first element selected from Group 1A elements, Group 3A elements and Group 5A elements and at least one second element selected from Group 8 elements.

The second compound may be represented by Formula 2 below.

$$Li_aCO_bM2_c(P_\beta O_\gamma)_d \quad \text{[Formula 2]}$$

(Here,

M2 is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, $0 \leq c \leq 8$, $0 \leq d \leq 13$, $0 < \beta \leq 4$, and $0 < \gamma \leq 10$).

Here, the second compound may be an oxide having a single crystal structure or amorphous structure, but the present invention is not particularly limited thereto, and may be a group of heterogeneous oxides having at least one crystal structure and/or an amorphous structure.

When at least one of the second compounds is an oxide having a crystal structure, the second compound may have a crystal structure belonging to a space group Fd-3m, Pnma, P*/n, R3c or R-3m. Here, the crystal structure may be a monoclinic, cubic, orthorhombic or rhombohedral crystal structure.

In preferable cases, the proportion of a compound having the crystal structure belonging to the space group Fd-3m, R3c or R-3m among the second compounds is preferably 13 mol % or less, more preferably, 10 mol % or less, and even more preferably, 5 mol % or less to effectively remove residual Li present on the surface of the first compound. A crystal structure belonging to the space group Fd-3m, R3c or R-3m among the second compounds may be a cubic or rhombohedral crystal structure.

Representative examples of the oxide having the crystal structure belonging to the space group Fd-3m, R3c or R-3m, among the second compounds, may be $Co_3O_4$, $LiCoO_2$ and $P_2O_5$, and other than these, an oxide that can act as an impurity similar to residual Li since it is present on the surface of the first compound due to its existence on the surface of the first compound may be further included.

To effectively remove residual Li present on the surface of the first compound, when the proportion of a compound having the crystal structure belonging to the space group Fd-3m, R3c or R-3m among the second compounds is more than 13 mol %, due to the second compound, the effect of improving the electrochemical characteristics and stability of the positive electrode active material is insignificant, or the electrochemical characteristics and stability of the positive electrode active material may rather be reduced.

In addition, the second compound may include a first oxide represented by Formula 3 below and a second oxide represented by Formula 4 below.

$$Li_aCo_{b'}M3'_{c'}(P_\beta O_\gamma)_{d'} \quad \text{[Formula 3]}$$

(Here,

M3' is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 < a' \leq 10$, $0 \leq b' \leq 8$, $0 \leq c' \leq 8$, $0 < d' \leq 13$, $0 \leq \beta' \leq 4$, and $0 < \gamma' \leq 10$).

$$Co_{b''}M3''_{c''}(P_{\beta''}O_{\gamma''})_{d''} \quad \text{[Formula 4]}$$

(Here,

M3" is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq b'' \leq 8$, $0 \leq c'' \leq 8$, $0 \leq d'' \leq 13$, $0 \leq \beta'' \leq 4$, and $0 < y'' \leq 10$).

For example, the first oxide may be lithium phosphate, lithium cobalt phosphate, lithium metal (excluding cobalt) phosphate, lithium metal (excluding cobalt)-cobalt phosphate, lithium cobalt oxide and/or lithium metal (excluding cobalt) oxide, and the second oxide may be phosphorus pentoxide, cobalt phosphate, metal (excluding cobalt) phosphate, metal (excluding cobalt)-cobalt phosphate, cobalt oxide and/or metal (excluding cobalt) oxide.

Additionally, the first oxide/second oxide ratio as defined above in the second compound present in the coating layer is preferably 0.87 or more.

When the first oxide/second oxide ratio as defined above in the second compound present in the coating layer is less than 0.87 (in other words, when a ratio of a metal oxide to lithium phosphate increases), the improvement in electrochemical characteristics and stability of the positive electrode active material by the second compound may be insignificant, or there is a risk of deteriorating the electrochemical characteristics and stability of the positive electrode active material.

In addition, as described above, the first oxide and the second oxide may have a concentration gradient decreasing from the surface to the center of the secondary particle, and therefore, a Co concentration of the lithium composite oxide may have a concentration gradient decreasing from the surface to the center of the secondary particle.

In another embodiment, a third compound represented by Formula 5 below may be further included on at least a part of the surface of the first compound.

$$Li_cW_fM4_gO_h \quad \text{[Formula 5]}$$

(Here,

M4 is at least one selected from Ni, Mn, Co, Fe, Cu, Nb, Mo, Ti, Al, Cr, Zr, Zn, Na, K, Ca, Mg, Pt, Au, B, P, Eu, Sm, Ce, V, Ba, Ta, Sn, Hf, Ce, Gd and Nd, $0 \leq e \leq 10$, $0 < f \leq 8$, $0 \leq g \leq 8$, and $2 \leq h \leq 13$).

The third compound may be present in the coating layer in which the second compound is present, or may be present independently of the coating layer. In addition, the third compound may be present on at least a part of the interface between primary particles of the first compound and secondary particles formed by aggregating the primary particles. In addition, the concentration of the third compound may have a concentration gradient decreasing from the surface to the center of the secondary particle.

In still another embodiment, the positive electrode active material may further include a shell layer covering at least a part of the surface (surface that is not covered with the coating layer) of the first compound and the surface of the coating layer.

Here, the shell layer may include a fourth compound represented by Formula 4 below. That is, the shell layer may be defined as a region in which the fourth compound represented by Formula 4 below is present.

$$Li_jM4_kO_l \quad \text{[Formula 4]}$$

(Here, M4 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq j \leq 10$, $0 \leq k \leq 8$, and $2 \leq l \leq 13$).

In addition, the shell layer may simultaneously have heterogeneous fourth compounds in one layer, or the heterogeneous fourth compounds represented by Formula 4 in separate layers.

The fourth compound represented by Formula 4 may be physically and/or chemically coupled with the first compound, the second compound and/or the third compound. In addition, the fourth compound may be present in a solid solution with the first compound, the second compound and/or the third compound.

The fourth compound may be an oxide in which lithium and an element represented by M4 are complexed, or an M4 oxide, and the oxide may be, for example, $Li_aW_bO_c$, $Li_aZr_bO_c$, $Li_aTi_bO_c$, $Li_aNi_bO_c$, $Li_aB_bO_c$, $W_bO_c$, $Zr_bO_c$, $Ti_bO_c$ or $B_bO_c$. However, the above-described examples are merely described for convenience to help in understanding, and the oxide defined herein is not limited to the above-described examples.

In another example, the fourth compound may further include an oxide in which lithium and at least two types of elements represented by M4 are complexed, or an oxide in which lithium and at least two types of elements represented by M4 are complexed. The oxide in which lithium and at least two types of elements represented by A are complexed may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not particularly limited thereto.

Here, the fourth compound may have a concentration gradient decreasing from the surface to the center of the secondary particle. Accordingly, the concentration of the fourth compound may be decreased from the outermost surface to the center of the secondary particle.

As described above, as the fourth compound has a concentration gradient decreasing from the surface to the center of the secondary particle, residual Li present on the surface of the first compound may be additionally reduced. In addition, due to the fourth compound, a decrease in crystallinity in the internal region of the surface of the first compound may be prevented. In addition, the destruction of the entire structure of the positive electrode active material may be prevented by the fourth compound during an electrochemical reaction.

Additionally, the shell layer may include a first shell layer including at least one fourth compound represented by Formula 4 and a second shell layer including the at least fourth compound represented by Formula 4, and an oxide different from an oxide included in the first shell layer.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Yet another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 µm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si-C composite or a Sn-C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, $\gamma$-butyrolactone, or $\varepsilon$-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1

Preparation Example 1. Preparation of Positive Electrode Active Material

(1) Example 1

A spherical $Ni_{0.91}Co_{0.08}Mn_{0.01}(OH)_2$ hydroxide precursor was synthesized by a co-precipitation method. Specifically, in a 90 L reactor, 25 wt % NaOH and 30 wt % $NH_4OH$ were added to a 1.5 M complex transition metal sulfuric acid aqueous solution in which nickel sulfate, cobalt sulfate and manganese sulfate were mixed at a molar ratio of 91:8:1. The pH in the reactor was maintained at 11.5, the reactor temperature was maintained at 60° C., and an inert gas $N_2$ was introduced into the reactor to prevent oxidation of the prepared precursor. After synthesis and stirring were completed, washing and dehydration were performed using filter press (F/P) equipment, thereby obtaining a $Ni_{0.91}Co_{0.08}Mn_{0.01}(OH)_2$ hydroxide precursor.

Subsequently, LiOH (Li/(Ni+Co+Mn) molar ratio=1.01) was mixed in the synthesized precursor, and thermally treated by raising a temperature 2° C. per minute until 700° C. in a calcination furnace for 10 hours while maintaining an $O_2$ atmosphere, thereby obtaining a lithium composite oxide.

Subsequently, the lithium composite oxide, a Co-containing raw material $(Co_3(PO_4)_2)$ and a W-containing raw material $(WO_3)$ were mixed and calcined, thereby finally obtaining a positive electrode active material. Specifically, the lithium composite oxide, a Co-containing raw material $(Co_3(PO_4)_2)$ and a W-containing raw material $(WO_3)$ were mixed, and thermally treated by raising a temperature 2° C. per minute until 400° C. in a calcination furnace for 5 hours while maintaining an O2 atmosphere, and naturally cooled, thereby obtaining a positive electrode active material.

Each of the Co-containing raw material $(Co_3(PO_4)_2)$ and the W-containing raw material $(WO_3)$ was mixed at 0.3 mol % with respect to the mixture of the lithium composite oxide, Co-containing raw material $(Co_3(PO_4)_2)$ and the W-containing raw material $(WO_3)$.

The ICP analysis result for the composition of the positive electrode active material is shown in Table 1 below.

TABLE 1

| Element | Ni | Co | Mn | W | P |
|---|---|---|---|---|---|
| Content (mol %) | 90.35 | 8.22 | 0.99 | 0.31 | 0.13 |

(2) Example 2

A positive electrode active material was prepared in the same manner as in Example 1, except that the Co-containing raw material $(Co_3(PO_4)_2)$ was mixed to be 0.5 mol % with respect to the mixture of the lithium composite oxide, a Co-containing raw material $(Co_3(PO_4)_2)$ and a W-containing raw material $(WO_3)$. The ICP analysis result for the composition of the positive electrode active material is shown in Table 2 below.

TABLE 2

| Element | Ni | Co | Mn | W | P |
|---|---|---|---|---|---|
| Content (mol %) | 90.08 | 8.21 | 0.99 | 0.50 | 0.22 |

(3) Example 3

A positive electrode active material was prepared in the same manner as in Example 1, except that the W-containing raw material $(WO_3)$ was mixed to be 1.0 mol % with respect to the mixture of the lithium composite oxide, a Co-containing raw material $(Co_3(PO_4)_2)$ and a W-containing raw material $(WO_3)$. The ICP analysis result for the composition of the positive electrode active material is shown in Table 3 below.

TABLE 3

| Element | Ni | Co | Mn | W | P |
|---|---|---|---|---|---|
| Content (mol %) | 89.33 | 8.31 | 0.98 | 0.97 | 0.41 |

(4) Example 4

A positive electrode active material was prepared in the same manner as in Example 1, except that 0.05 mol % of a Zr-containing compound $(ZrO_2)$ was additionally mixed in a synthesized precursor. The ICP analysis result for the composition of the positive electrode active material is shown in Table 4 below.

TABLE 4

| Element | Ni | Co | Mn | Zr | W | P |
|---|---|---|---|---|---|---|
| Content (mol %) | 90.34 | 8.20 | 0.99 | 0.05 | 0.30 | 0.12 |

(5) Example 5

A positive electrode active material was prepared in the same manner as in Example 1, except that 0.2 mol % of a Ti-containing compound ($TiO_2$) was additionally mixed in the same calcination furnace, and thermally treated by raising a temperature 2° C. per minute until 400° C. for 5 hours while maintaining an 02 atmosphere after the lithium composite oxide, a Co-containing raw material ($Co_3(PO_4)_2$) and a W-containing raw material ($WO_3$) were mixed and thermally treated. The ICP analysis result for the composition of the positive electrode active material is shown in Table 5 below.

TABLE 5

| Element | Ni | Co | Mn | Ti | W | P |
|---|---|---|---|---|---|---|
| Content (mol %) | 90.28 | 8.18 | 0.99 | 0.18 | 0.25 | 0.12 |

(6) Comparative Example 1

A positive electrode active material was prepared in the same manner as in Example 1, except that the lithium composite oxide was not mixed with a Co-containing raw material ($Co_3(PO_4)_2$) and a W-containing raw material ($WO_3$) and was thermally treated for 5 hours by raising a temperature 2° C. per minute until 400° C. The ICP analysis result for the composition of the positive electrode active material is shown in Table 6 below.

TABLE 6

| Element | Ni | Co | Mn | W | P |
|---|---|---|---|---|---|
| Content (mol %) | 91.01 | 7.93 | 1.06 | — | — |

(7) Comparative Example 2

A positive electrode active material was prepared in the same manner as in Example 1, except that only a W-containing raw material ($WO_3$) was mixed in the lithium composite oxide and calcined. The ICP analysis result for the composition of the positive electrode active material is shown in Table 7 below.

TABLE 7

| Element | Ni | Co | Mn | W | P |
|---|---|---|---|---|---|
| Content (mol %) | 90.78 | 7.90 | 1.01 | 0.31 | — |

(8) Comparative Example 3

A positive electrode active material was prepared in the same manner as in Example 1, except that only a Co-containing raw material ($Co_3(PO_4)_2$) was mixed in the lithium composite oxide and calcined. The ICP analysis result for the composition of the positive electrode active material is shown in Table 8 below.

TABLE 8

| Element | Ni | Co | Mn | W | P |
|---|---|---|---|---|---|
| Content (mol %) | 90.57 | 8.28 | 1.01 | — | 0.14 |

(9) Comparative Example 4

A positive electrode active material was prepared in the same manner as in Example 1, except that the lithium composite oxide was not treated with a Co-containing raw material ($Co_3(PO_4)_2$) and a W-containing raw material ($WO_3$) and was thermally treated for 5 hours by raising a temperature 2° C. per minute until 700° C. The ICP analysis result for the composition of the positive electrode active material is shown in Table 9 below.

TABLE 9

| Element | Ni | Co | Mn | W | P |
|---|---|---|---|---|---|
| Content (mol %) | 91.09 | 7.91 | 1.00 | — | — |

(10) Comparative Example 5

A positive electrode active material was prepared in the same manner as in Example 1, except that only a W-containing raw material ($WO_3$) was mixed in the lithium composite oxide and thermally treated for 5 hours by raising a temperature 2° C. per minute until 700° C. The ICP analysis result for the composition of the positive electrode active material is shown in Table 10 below.

TABLE 10

| Element | Ni | Co | Mn | W | P |
|---|---|---|---|---|---|
| Content (mol %) | 90.74 | 7.96 | 1.00 | 0.30 | — |

(11) Comparative Example 6

A positive electrode active material was prepared in the same manner as in Example 1, except that only a Co-containing raw material ($Co_3(PO_4)_2$) was mixed in the lithium composite oxide and thermally treated for 5 hours by raising a temperature 2° C. per minute until 700° C. The ICP analysis result for the composition of the positive electrode active material is shown in Table 11 below.

TABLE 11

| Element | Ni | Co | Mn | W | P |
|---|---|---|---|---|---|
| Content (mol %) | 90.60 | 8.24 | 1.01 | — | 0.15 |

(12) Comparative Example 7

A positive electrode active material was prepared in the same manner as in Example 1, except that a Co-containing raw material ($Co_3(PO_4)_2$) and a W-containing raw material ($WO_3$) were mixed in the lithium composite oxide and thermally treated for 5 hours by raising a temperature 2° C. per minute until 700° C. The ICP analysis result for the composition of the positive electrode active material is shown in Table 12 below.

TABLE 12

| Element | Ni | Co | Mn | W | P |
|---|---|---|---|---|---|
| Content (mol %) | 90.27 | 8.34 | 0.94 | 0.30 | 0.15 |

Preparation Example 2. Production of Lithium Secondary Battery

A positive electrode slurry was prepared by dispersing 92 wt % of each of the positive electrode active materials prepared according to Preparation Example 1, 4 wt % of artificial graphite, and 4 wt % of a PVDF binder in 30 g of N-methyl-2-pyrrolidone (NMP). The positive electrode slurry was uniformly applied onto an aluminum thin film having a thickness of 15 μm, and vacuum-dried at 135° C., thereby manufacturing a positive electrode for a lithium secondary battery.

A coin battery was produced using a lithium foil as a counter electrode for the positive electrode, a porous polyethylene film (Celgard 2300, thickness: 25 μm) as a separator, and an electrolyte in which $LiPF_6$ was present at a concentration of 1.15M in a solvent in which ethylene carbonate and ethyl methyl carbonate were mixed in a volume ratio of 3:7 was used.

Experimental Example 1. XPD analysis for positive electrode active material $Ni_{occ}$ of the positive electrode active material and a coating material on the surface of the positive electrode active material were confirmed by performing X-ray diffraction (XRD) analysis on the positive electrode active materials prepared according to Preparation Example 1. The XRD analysis was performed by a Bruker D8 Advance diffractometer utilizing Cu Kα radiation (1.540598 Å).

(1) Measurement of $Ni_{occ}$ of Positive Electrode Active Material

The occupancy (content) of Ni metal inserted into the Li 3a site of the positive electrode active materials prepared according to Preparation Example 1 was measured through Reitveld refinement of an X-ray diffraction pattern. The measurement results are shown in Table 13 below.

TABLE 13

| Classification | c/a ratio | $Ni_{occ}$ in 3a site (%) |
|---|---|---|
| Example 1 | 4.940 | 2.41 |
| Example 2 | 4.940 | 2.47 |
| Example 3 | 4.940 | 2.52 |
| Example 4 | 4.940 | 2.23 |
| Example 5 | 4.940 | 2.10 |
| Comparative Example 1 | 4.940 | 2.27 |

TABLE 13-continued

| Classification | c/a ratio | $Ni_{occ}$ in 3a site (%) |
|---|---|---|
| Comparative Example 2 | 4.940 | 2.39 |
| Comparative Example 3 | 4.940 | 2.30 |
| Comparative Example 4 | 4.940 | 1.62 |
| Comparative Example 5 | 4.940 | 2.09 |
| Comparative Example 6 | 4.940 | 1.68 |
| Comparative Example 7 | 4.940 | 2.29 |

Referring to the results in Table 13, when a Co-containing raw material ($Co_3(PO_4)_2$) and a W-containing raw material ($WO_3$) are mixed in the lithium composite oxide, compared with when only a Co-containing raw material ($Co_3(PO_4)_2$) or W-containing raw material ($WO_3$) is mixed in the lithium composite oxide, it may be confirmed that the occupancy of Ni inserted into the Li 3a site increases. In addition, referring to Example 1 and Comparative Example 7, by thermal treatment at a relatively low temperature after a Co-containing raw material ($Co_3(PO_4)_2$) and a W-containing raw material ($WO_3$) are mixed in the lithium composite oxide, the occupancy of Ni inserted into the Li 3a site may be improved.

As such, the increase in the occupancy of Ni inserted into the Li 3a site by thermal treatment at a relatively low temperature after a Co-containing raw material ($Co_3(PO_4)_2$) and a W-containing raw material ($WO_3$) are mixed in the lithium composite oxide, compared with by thermal treatment after only one of a Co-containing raw material ($Co_3(PO_4)_2$) and a W-containing raw material ($WO_3$) is mixed in the lithium composite oxide, or thermal treatment at a relatively high temperature after a Co-containing raw material ($Co_3(PO_4)_2$) and a W-containing raw material ($WO_3$) are mixed, may be due to the insertion of W into the Li 3a site by doping tungsten into the crystal lattice of the lithium composite oxide.

(2) Analysis of Coating Material on Surface of Positive Electrode Active Material The contents of coating materials (that is, second compound) on the surface of the positive electrode active materials prepared according to Preparation Example 1 were quantitatively analyzed by a method of screening the oxides listed in Tables 14 and 15 below from XRD raw data measured using a Bruker's EVA program.

The analysis results of the coating materials on the surface of the positive electrode active materials analyzed by the method are shown in Tables 14 and 15 below.

TABLE 14

| Classification | Example 1 (%) | Example 2 (%) | Example 3 (%) | Example 4 (%) | Example 5 (%) |
|---|---|---|---|---|---|
| $Co_3(PO_4)_2$ | 47.5 | 49.2 | 51.2 | 46.2 | 45.1 |
| $LiCo(PO_4)$ | 24.6 | 28.4 | 30.4 | 23.7 | 22.1 |
| $Co_3O_4$ | — | — | — | — | — |
| $LiPO_3$ | 27.8 | 22.4 | 18.4 | 30.1 | 32.8 |
| $P_2O_5$ | — | — | — | — | — |
| $LiCoO_2$ | — | — | — | — | — |

TABLE 15

| Classification | C. Example 1 (%) | C. Example 2 (%) | C. Example 3 (%) | C. Example 4 (%) | C. Example 5 (%) | C. Example 6 (%) | C. Example 7 (%) |
|---|---|---|---|---|---|---|---|
| $Co_3(PO_4)_2$ | — | — | 47.2 | — | — | 47.2 | 46.7 |
| $LiCo(PO_4)$ | — | — | 24.3 | — | — | 24.3 | 21.6 |

TABLE 15-continued

| Classification | C. Example 1 (%) | C. Example 2 (%) | C. Example 3 (%) | C. Example 4 (%) | C. Example 5 (%) | C. Example 6 (%) | C. Example 7 (%) |
|---|---|---|---|---|---|---|---|
| $Co_3O_4$ | — | — | — | — | — | 8.9 | 9.0 |
| $LiPO_3$ | — | — | 28.5 | — | — | 15.2 | 18.6 |
| $P_2O_5$ | — | — | — | — | — | 3.2 | 2.6 |
| $LiCoO_2$ | — | — | — | — | — | 1.2 | 1.6 |

*C. Example:Comparative Example

Referring to the results of Tables 14 and 15, unlike the positive electrode active materials according to Comparative Examples 6 and 7, it was confirmed that in the case of the positive electrode active materials according to Examples 1 to 5, proportions of compounds ($Co_3O_4$, $LiCoO_2$ and $P_2O_5$) having a crystal structure belonging to the space group Fd-3m, R3c or R-3m of the oxides defined as the second compounds in the present invention are 13 mol % or less by mixing a Co-containing raw material ($Co_3(PO_4)_2$) and a W-containing raw material ($WO_3$) in the lithium composite oxide and thermally treating the mixture at a relatively low temperature.

Meanwhile, as the positive electrode active material according to Comparative Example 3 was prepared in the same manner as used for the positive electrode active material according to Example 1, except that thermal treatment was performed without mixing of a W-containing raw material ($WO_3$), it can be confirmed that an oxide defined as a second compound had a similar composition.

Experimental Example 2. Measurement of Unreacted Lithium of Positive Electrode Active Material Unreacted lithium for the positive electrode active materials prepared according to Preparation Example 1 was measured with an amount of 0.1M HCl used until pH 4 by pH titration. First, 5 g each of the positive electrode active materials prepared according to Preparation Example 1 was added to 100 mL of DIW, stirred for 15 minutes and filtered. 50 ml of the filtered solution was taken, and then 0.1 M HCl was added to measure HCl consumption according to a pH change to determine Q1 and Q2, thereby calculating a content of unreacted LiOH.

M1=23.95 (LiOH Molecular weight)

M2=73.89 ($Li_2CO_3$ Molecular weight)

SPL Size=(Sample weight×Solution Weight)/Water Weight

LiOH (wt %)=[(Q1−Q2)×C×M1×100]/(SPL Size×1000)

The measurement results for the content of lithium impurities present in the positive electrode active material measured by the above equation are shown in Table 16 below.

TABLE 16

| Classification | LiOH (ppm) |
|---|---|
| Example 1 | 2,378 |
| Example 2 | 2,090 |
| Example 3 | 1,789 |
| Example 4 | 2,423 |
| Example 5 | 2,892 |
| Comparative Example 1 | 4,432 |
| Comparative Example 2 | 2,911 |
| Comparative Example 3 | 3,059 |
| Comparative Example 4 | 5,503 |
| Comparative Example 5 | 7,148 |
| Comparative Example 6 | 5,020 |
| Comparative Example 7 | 6,363 |

(2) Evaluation of Electrochemical Properties of Lithium Secondary Battery

The initial charge capacity, initial discharge capacity, initial reversible efficiency and discharge capacity rate (C-rate) of the lithium secondary batteries produced according to Preparation Example 2 were measured by performing a charge/discharge experiment using an electrochemical analyzer (Toyo, Toscat-3100) at 25° C. in a voltage range of 3.0V to 4.3V at a discharge rate of 0.1 C to 5.0 C.

In addition, the lithium secondary batteries manufactured by the above-described method were subjected to 50 cycles of charging/discharging at 25° C., within a driving voltage range of 3.0V to 4.4V under a 1 C/1 C condition, and a ratio of the discharge capacity at the 50$^{th}$ cycle with respect to an initial capacity (cycle capacity retention) was measured.

Meanwhile, the initial resistance of the lithium secondary batteries produced according to Preparation Example 2 was measured in a frequency range (10 kHz to 0.01 Hz) using electrochemical impedance spectroscopy (EIS).

The measurement result is shown in Table 17 below.

TABLE 17

| Classification | Initial charge capacity (mAh/g) | Initial discharge capacity (mAh/g) | Initial reversible efficiency (%) | Lifetime characteristics (%) | C-rate (5.0 C/0.1 C) (%) | Initial EIS |
|---|---|---|---|---|---|---|
| Example 1 | 238.6 | 220.5 | 92.4 | 91.6 | 83.5 | 12.6 |
| Example 2 | 237.8 | 218.2 | 91.7 | 91.3 | 83.1 | 15.1 |
| Example 3 | 236.2 | 216.4 | 91.6 | 91.7 | 83.0 | 19.7 |
| Example 4 | 235.1 | 215.2 | 91.5 | 90.1 | 82.9 | 13.2 |
| Example 5 | 232.2 | 211.3 | 91.0 | 91.1 | 83.0 | 12.2 |
| Comparative Example 1 | 239.8 | 213.1 | 88.8 | 91.3 | 85.5 | 19.6 |

TABLE 17-continued

| Classification | Initial charge capacity (mAh/g) | Initial discharge capacity (mAh/g) | Initial reversible efficiency (%) | Lifetime characteristics (%) | C-rate (5.0 C/0.1 C) (%) | Initial EIS |
|---|---|---|---|---|---|---|
| Comparative Example 2 | 238.3 | 215.8 | 90.6 | 91.1 | 84.2 | 11.1 |
| Comparative Example 3 | 240.0 | 215.1 | 89.7 | 91.3 | 84.7 | 30.2 |
| Comparative Example 4 | 241.5 | 217.8 | 90.2 | 86.7 | 85.5 | 13.6 |
| Comparative Example 5 | 241.7 | 220.7 | 91.3 | 73.6 | 83.6 | 5.4 |
| Comparative Example 6 | 242.5 | 219.5 | 90.5 | 86.8 | 85.5 | 16.1 |
| Comparative Example 7 | 241.8 | 221.4 | 91.6 | 76.7 | 77.3 | 5.4 |

A positive electrode active material according to various embodiments of the present invention can control a content of Li impurities remaining on a surface by forming a lithium metal oxide and/or lithium metal phosphate in the surface without a washing process to reduce the amount of residual lithium present on the surface of the positive electrode active material.

Therefore, the decreases in electrochemical characteristics and stability of the positive electrode active material due to Li impurities remaining on the surface of the positive electrode active material can be prevented in advance.

Accordingly, a lithium secondary battery can improve various electrochemical characteristics such as capacity characteristics, lifetime characteristics and rate characteristics, which are important indicators for evaluating the performance of the lithium secondary battery by using positive electrode active materials according to various embodiments of the present invention.

In the above, the embodiments of the present invention have been described, but it will be understood by those of ordinary skill in the art that the present invention may be changed and modified in various ways by additions, alterations, or deletions of components without departing from the spirit of the present invention defined in the appended claims.

What is claimed is:

1. A positive electrode active material, comprising:
a first compound enabling lithium intercalation/deintercalation; and
a coating layer present on at least a part of the surface of the first compound,
wherein the first compound has an Ni content of 80 mol % or more,
wherein the first compound is represented by Formula 1 below:

$$Li_wNi_{1-(x+y+z)}Co_xM1_yM2_zO_{2+\alpha} \qquad \text{[Formula 1]}$$

wherein,
M1 is at least one selected from Mn and Al,
M2 is at least one selected from Mn, P, Sr, Ba, B, Ti, Zr, Al, Hf, Ta, Mg, V, Zn, Si, Y, Sn, Ge, Nb, W and Cu,
M1 and M2 are different elements,
$0.5 \leq w \leq 1.5$, $0 \leq x \leq 0.20$, $0 \leq y \leq 0.20$, $0 \leq z \leq 0.20$, and $0 \leq a \leq 0.02$,
wherein the coating layer comprises a second compound containing phosphorus (P) and a third compound containing tungsten (W), wherein the first compound does not include any coating layer formed thereon that comprises a compound having a crystal structure belonging to a space group Fd-3m, R3c and R-3m,
wherein the second compound comprises a first oxide including $LiCo(PO_4)$ and $LiPO_3$, and a second oxide including $Co_3(PO_4)_2$,
wherein a ratio of the first oxide to the second oxide in the second compound present in the coating layer is less than 0.87, and
wherein a content of LiOH in the positive electrode active material is 1,789 to 2,892 ppm.

2. The positive electrode active material of claim 1, wherein tungsten is present in the crystal lattice of the first compound.

3. The positive electrode active material of claim 1, wherein the second compound is represented by Formula 2 below:

$$Li_aCo_bM3_c(P_\beta O_\gamma)_d \qquad \text{[Formula 2]}$$

wherein,
M3 is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Gd and Nd,
$0 \leq a \leq 10$, $0 \leq b \leq 8$, $0 \leq c \leq 8$, $0 < d \leq 13$, $0 < \beta \leq 4$, and $0 < \gamma \leq 10$.

4. The positive electrode active material of claim 3, wherein the second compound comprises a first oxide represented by Formula 3 below and a second oxide represented by Formula 4 below:

$$Li_{a'}Co_{b'}M3'_{c'}(P_\beta O_{\gamma'})_{d'} \qquad \text{[Formula 3]}$$

wherein,
M3' is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Gd and Nd,
$0 < a' \leq 10$, $0 \leq b' \leq 8$, $0 \leq c' \leq 8$, $0 < d' \leq 13$, $0 \leq \beta' \leq 4$, and $0 < \gamma' \leq 10$; and $$Co_{b''}M3''_{c''}(P_{\beta''}O_{\gamma''})_{d''} \qquad \text{[Formula 4]}$$

wherein,
M3" is at least one selected from Ni, Mn, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Gd and Nd,
$0 \leq b'' \leq 8$, $0 \leq c'' \leq 8$, $0 < d'' \leq 13$, $0 \leq \beta'' \leq 4$, and $0 < \gamma'' \leq 10$.

5. The positive electrode active material of claim 1, wherein the third compound is represented by Formula 5 below, $$Li_eW_fM4_gO_h \qquad \text{[Formula 5]}$$

wherein,

M4 is at least one selected from Ni, Mn, Co, Fe, Cu, Nb, Mo, Ti, Al, Cr, Zr, Zn, Na, K, Ca, Mg, Pt, Au, B, P, Eu, Sm, Ce, V, Ba, Ta, Sn, Hf, Gd and Nd, $0 \leq e \leq 10$, $0 < f \leq 8$, $0 \leq g \leq 8$, and $2 \leq h \leq 13$.

6. The positive electrode active material of claim 5, wherein the content of the second compound on the first compound is higher than that of the third compound.

7. A positive electrode comprising the positive electrode active material of claim 1.

8. A lithium secondary battery using the positive electrode of claim 7.

\*   \*   \*   \*   \*